United States Patent [19]
Tronolone et al.

[11] Patent Number: 6,078,507
[45] Date of Patent: Jun. 20, 2000

[54] PATCH PANEL WITH INCORPORATED DISTRIBUTION AMPLIFIERS

[76] Inventors: James Tronolone; Virginia Tronolone, both of 56 Cedar Rd., Ringwood, N.J. 07456

[21] Appl. No.: 08/939,250

[22] Filed: Sep. 29, 1997

[51] Int. Cl.⁷ .................................................. H02B 1/20
[52] U.S. Cl. ..................... 361/827; 361/730; 361/826; 439/579; 174/65 R
[58] Field of Search ................... 361/728–730, 361/752, 788, 796, 790, 826, 827; 439/43, 579; 174/65 R, 60

[56] References Cited

U.S. PATENT DOCUMENTS

| | | | |
|---|---|---|---|
| 5,291,377 | 3/1994 | DiGiovanni | 361/826 |
| 5,396,405 | 3/1995 | Reed et al. | 361/827 |
| 5,552,962 | 9/1996 | Feustel et al. | 361/733 |
| 5,594,347 | 1/1997 | Louwagie et al. | 324/539 |

*Primary Examiner*—Leo P. Picard
*Assistant Examiner*—Jayprakash N. Gandhi
*Attorney, Agent, or Firm*—Clifford G. Frayne

[57] ABSTRACT

A patch panel and distribution amplifier system within a single housing, including an input module and a plurality of output modules within the housing interconnected to a rear panel for input and output connectors and a front panel for the interconnection of jacks to the input and output modules of adjacent patch panel and distribution amplifier housings all connections being configurable to conform to all signal formats.

5 Claims, 3 Drawing Sheets

PATCH PANEL WITH INCORPORATED DISTRIBUTION AMPLIFIERS

BACKGROUND OF THE INVENTION

1. Field of Invention

The present invention relates to a patch panel system and relates particularly to a patch panel system of the kind employed for the patching of audio, video, data, recording, broadcasting, and telecommunication lines and which incorporates the distribution amplifiers within the patch panel.

2. Discussion of the Prior Art

Jack panels or patch panels are well-known in the broadcasting, telecommunication and other audio and video industries where they are used extensively to provide flexibility in the interconnection of audio, video or data circuits. By employing a patch panel, various circuits can be connected together temporarily using one or more patch cords provided with plugs that are received in a plurality of jacks mounted in the panel of the patch panel. In a typical installation, a plurality of patch panels would be utilized with each patch panel having a plurality of input wires and output wires secured thereto and connected to the piece of electrical equipment be it a telephone, video monitor, computer, computer monitor or the like. The distribution of the signals further required a plurality of wires interconnecting the patch panels with distribution amplifiers to insure the quality of the signal as it is directed between the various desired electrical equipment. This requirement of interconnecting the patch panels with a plurality of distribution amplifiers increases the cost of installing a facility where audio, video and data transmission and interconnection is required and further increases the cost of maintaining such a system. If the requirement of connecting the patch panels to distribution amplifiers could be eliminated, approximately 50% of the labor and wiring materials for installing such a facility could be eliminated. Cost reduction could also be obtained by the reduced space required for the equipment. The applicant has therefore developed a combination patch panel and amplifier system which incorporates the distribution amplifiers in the patch panel.

Physically, the combination patch panel and distribution amplifier system would consist of a housing that could accommodate input modules and output modules and have a rear panel for the input and output connectors and a front panel for the jacks for the input and output modules. Preferably, the housing could be oriented to accommodate one input circuit and multiple output circuits such that multiple housings could be mounted in one tray which will confirm to EIA dimensions for rack mountable equipment and thus not require any reconfiguration or redesign of the remainder of the system. In operation, the input signal is applied to the rear panel mounted input connector. Internally that signal is connected to a front panel self-normalling jack which is integral to the unit. The output of the jack is wired internally to the input of the input module. Also internal to the box are the outputs of the input module wired to the inputs of the output modules. The output of each output module is wired internally to a front panel mounted self-normalling jack. The output of the jack is internally wired to a rear panel mounted output connector. The input modules and output modules and the input, output rear panel mounted connectors and front panel mounted jacks are all configurable to conform to many signal formats. For example, analog audio, analog video, AES audio, serial digital video, time code, RS-422 data, RS232 data, LAN networks, etc.

OBJECTS OF THE INVENTION

An object of the present invention is to provide for a combination patch panel and distribution amplifier which greatly reduces the wiring requirements between electrical equipment involved in the audio, video or data transmission industries.

Another object of the present invention is to provide for a combination patch panel and distribution amplifier system which eliminates the need for a separate distribution amplifiers and the wiring requisite therewith in the installation of audio, visual and data transmission facilities.

A still further object of the present invention is to provide for a novel patch panel and distribution amplifier system which is compatible with all audio, video and data transmission systems.

A still further object of the present invention is to provide for a novel patch panel and distribution amplifier system which provides for greater flexibility in the audio, video and data transmission industries.

SUMMARY OF THE INVENTION

A combination patch panel and distribution amplifier system within a single housing, comprising an input module and a plurality of output modules within the housing interconnected to a rear panel for input and output connectors and a front panel for the interconnection of jacks to the input and output modules the input modules, output modules, input output rear panel mounted connectors and front panel mounted jacks all being configurable to conform to all signal formats.

BRIEF DESCRIPTION OF THE DRAWINGS

These and other objects of the present invention will become apparent particularly when taken in light of the following illustrations wherein.

DETAILED DESCRIPTION OF THE DRAWINGS

Figure 1:
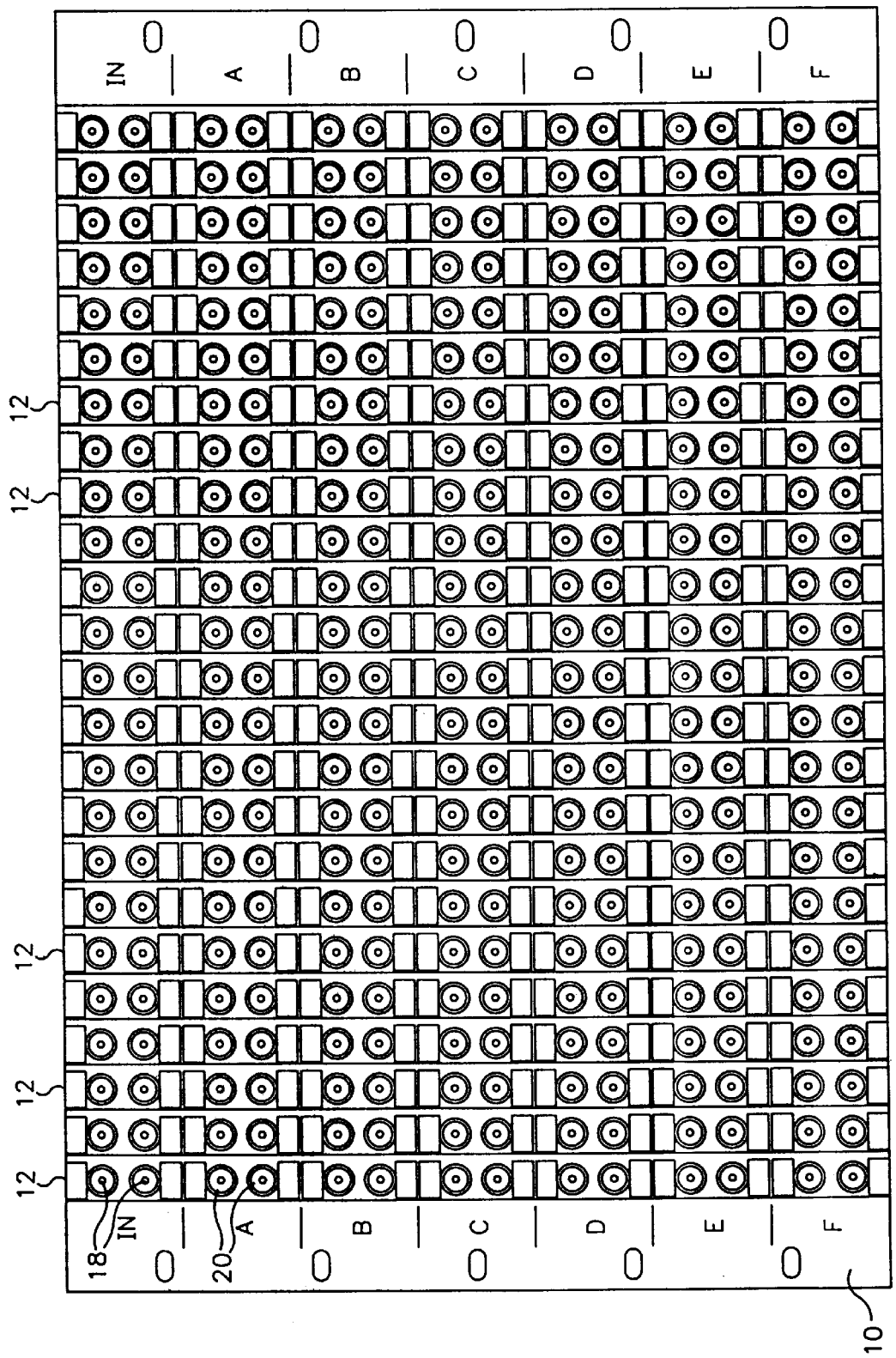
FIG. 1 is a front view of a tray having a plurality of patch amp housing.
Figures 3, 4:
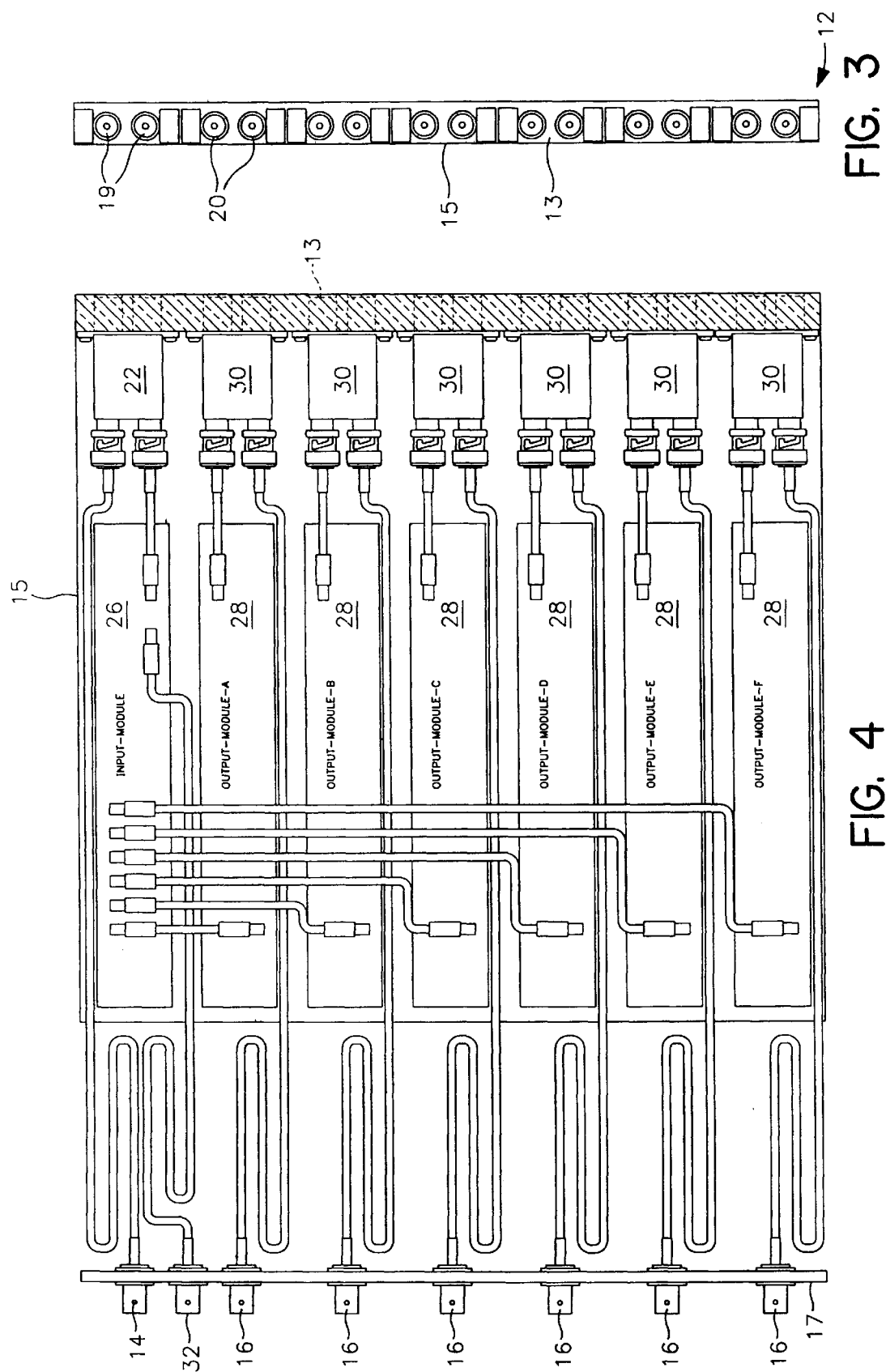
FIG. 3 is a front view of the face of a single patch amp housing.
FIG. 4 is a side view of a single patch amp housing illustrating the electrical connections therein.

FIG. 1 illustrates a tray 10 which conforms to standard EIA dimensions for rack mountable electronic equipment. The tray 10 illustrated in FIG. 1 has positioned thereon, 24 separate patch amps 12. The tray 10, commonly referred to as a card cage, contains 24 slots, each slot designed to slidably receive a separate patch amp 12. FIG. 3 is an illustration of the front face 13 of a single patch amp 12 showing a narrow housing 15 with a plurality of jack receiving receptacles in vertical arrangement.

Figure 2:
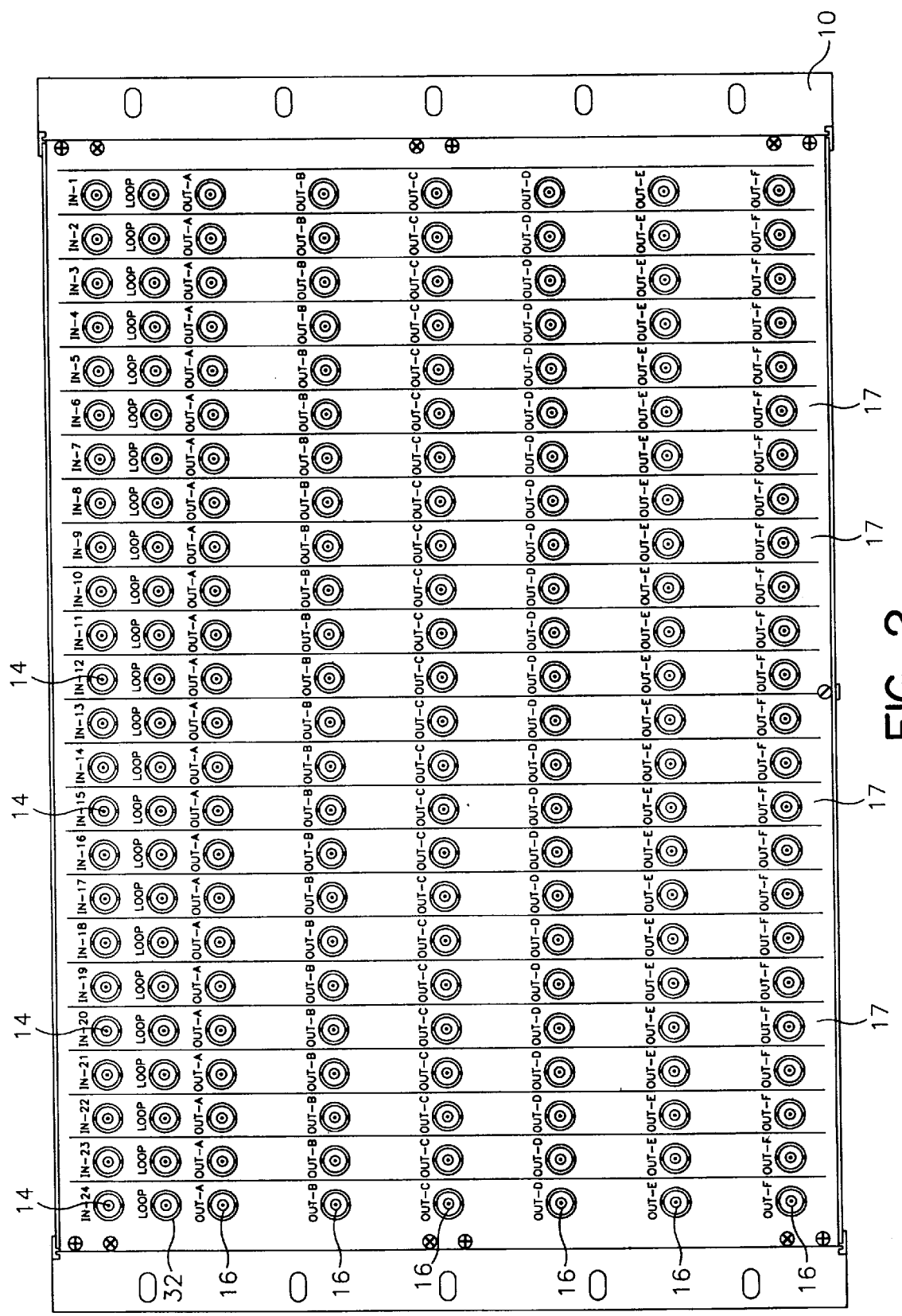
FIG. 2 is a rear view of the tray of FIG. 1.

FIG. 2 illustrates a view of the rear faces 17 of patch amps 12 in tray 10. Each patch amp 12 has an input connector 14 for receipt of a jack carrying an input signal. Each patch amp 12 also has on its rear face 17 a plurality of output connectors 16 for receipt of a connectorized cable for delivering a signal from the patch amp 12 to another source. The front face 13 of patch amp 12 would have two jack receptacles 18 associated with the input and two jack receptacles 20 associated with each of the output connectors 16 positioned on the rear face 17 of the patch amp.

Internally, the understanding of the patch amp assembly is best understood with reference to FIG. 4 which is a side view of the internal wiring of the patch amp. In FIG. 4, the rear face 17 of the patch amp illustrates the rear panel mounted input connector 14 and the plurality of rear panel mounted output connectors 16. The input connector 14 is wired internally of the patch amp housing 15 to a front face 13 self-normalling jack 22 which has two jack receiving receptacles 18 positioned on the front face 13 of the patch amp housing 15. The output of the self-normalling jack 22 is wired internally to the input of an input module 26 positioned in housing 15 between the input connector 14 on the rear face 17 and the self-normalling jack 22.

The input module 26 is internally wired to each of a plurality of output modules 28, one of each output modules 28 being in communication with a respective output connector 16 on the rear face 17 of the patch amp 12. Each output module 28 is wired internally to its own front panel mounted self-normalling jack 30, which in turn is internally wired to the rear panel mounted output connector 16. Each front panel mounted self-normalling jack 30 associated with an output module 28 has associated with it and positioned on its front face, two jack receptacles 20. Input module 26 also has a loop connector 32 positioned proximate to input connector 14 on the rear face 17 of patch amp 12, the purpose of which will be described hereafter in order to patch to a separate patch amp in a separate tray.

In this configuration, an input signal received at the input connector 14 on the rear face 17 of the patch amp 12 can be patched and rerouted as desired from the front panel jack receptacles 18 and 20 using industry standard patch cords for the type of jack for each module, namely audio, video, data, etc., or from output connectors 16. The input module 26 and the plurality of output modules 28 within each patch amp 12 are in fact distribution amplifiers which because of their location within the patch amp, eliminate the need for additional wiring when patching or rerouting signals.

As illustrated in the drawings and previously pointed out, a plurality of patch amps 12 would normally be positioned in tray or card cage 10 and would be utilized to interconnect a variety of electronic equipment or instrumentation. As an illustration of the operation of the patch amp 12, we will refer back to FIG. 2, a rear view of the patch amp assembly within tray or card cage 10 and presume that an input signal from a television camera inputted into input connector 14 of patch amp 24 on the extreme left side of the figure. We will also presume that the signal being inputted is a digital signal. The patch amp 12, together with the plurality of output modules 28 contained therein would allow the user to send that signal to six other electronic instruments. For instance, a connector could be secured to output connector 16 identified on FIG. 2 as "Out-A" and sent to a video recorder and a second connector could be secured to output connector 16 identified as "Out-B" and send the digital signal to a television monitor (not shown). Similarly, output connector 16 identified as "Out-C through Out-F" could send similar output signals.

If the digital input signal being inputted into the patch amp 12 identified as "IN-24" was required to be sent to another patch amp 12 in another tray or card cage 10, the user would merely insert a jack connector into the loop connector 32 of patch amp 12 identified as "IN-24" and connect the opposite end of the connector to an input connector 24 in a separate patch amp in another tray or card cage 10. The signal being inputted into the patch amp identified as "IN-24" would then be sent to the other interconnected patch amp in its respective tray.

On the front face of the patch amp array as positioned in tray or card cage 10, an individual could similarly redirect signals from one patch amp to another. Again, assuming a digital input signal is inputted into patch amp 12 identified as "IN-24" this particular patch amp would be the patch amp on the extreme right as viewed in FIG. 1. If an individual wishes to input that signal into another patch amp in the same array in tray or card cage 10, the individual would merely insert a jack plug into the upper jack receptacle 18 of the input module an connect the opposing end into the lower jack receptacle 18 of the input module on the adjacent patch amp 12 identified as "IN-23" or other patch amp in the tray.

Each patch amp 12 would be slidably removable from tray or card cage 10. The input and output connectors on the rear face and the interconnect connectors on the front face would be of such a length to allow the slidable relationship of the patch amp 12 to the tray or card cage 10 so as to permit replacement of modules or the like without interrupting the circuitry provided by the connectors.

Additionally, electrical power to the patch amps 12 could be provided in a variety of ways known in the art and could include a master buss configured in tray 10 to accommodate all of the patch amps 12 contained in a particular tray.

While the invention has been disclosed with respect to the preferred embodiment thereof, it will be recognized of those of ordinary skill in the art that many modifications will be apparent and this application is intended to cover any adaptations or variations thereof. Therefore, it is manifestly intended that this invention be only limited by the claims and the equivalence thereof.

Although the patch amp configuration is comprised of separate modules for inputs and outputs as described herein, many variations are possible. For instance, a variation could be one module consisting of the input module and all output modules on one printed circuit board. Another variation could be the input module and three output modules on one board and three additional output modules on another board. Another possible configuration consists of the front panel jack mounted to a printed circuit board module, thus eliminating the wires from the front panel mounted jack to the module. Another possible configuration consists of the signals being delivered from the rear mounted connectors via an edge connector to the module through to the front panel mounted jack.

We claim:

1. A patch field assembly for patching of audio, video or data circuits, the assembly comprising:

a housing having a front face and a rear face;

an input module disposed between said front face and said rear face;

a plurality of output modules disposed between said front face and said rear face;

an input jack and loop jack receptacle positioned on said rear face and in communication with said input module;

a plurality of output jack receptacles positioned on said rear face, each in communication with one of said output modules;

a plurality of self-normalizing jacks positioned on said front face, each of said jacks having a pair of jack receptacles, there being a said self-normalizing jack and pair of said jack receptacles for each said input module and plurality of said output modules;

said input module in communication with each of said output modules; and each of said output modules with said input module constituting a distribution amplifier.

2. The patch field assembly in accordance with claim 1 wherein an input signal into said input module selectively directed to one or more of said output modules and redirected by one or more of said output connectors on said rear face of said housing.

3. The patch field assembly in accordance with claim 1 wherein a plurality of said patch field assemblies alignably positioned within a card cage.

4. The patch field assembly in accordance with claim 3 wherein an input signal into one patch field assembly and an output signal from one patch field assembly can be transmitted to one or more adjacent patch field assemblies by means of said jack receptacles on said front face of said housing of said patch field assemblies.

5. The patch field assembly in accordance with claim 1 wherein an input signal into one patch field assembly in a single card cage assembly can be transmitted to a patch field assembly in a separate card cage assembly by means of said loop connector positioned on said rear face of said patch field assembly and in communication with said input module of said patch field assembly.

* * * * *